UNITED STATES PATENT OFFICE.

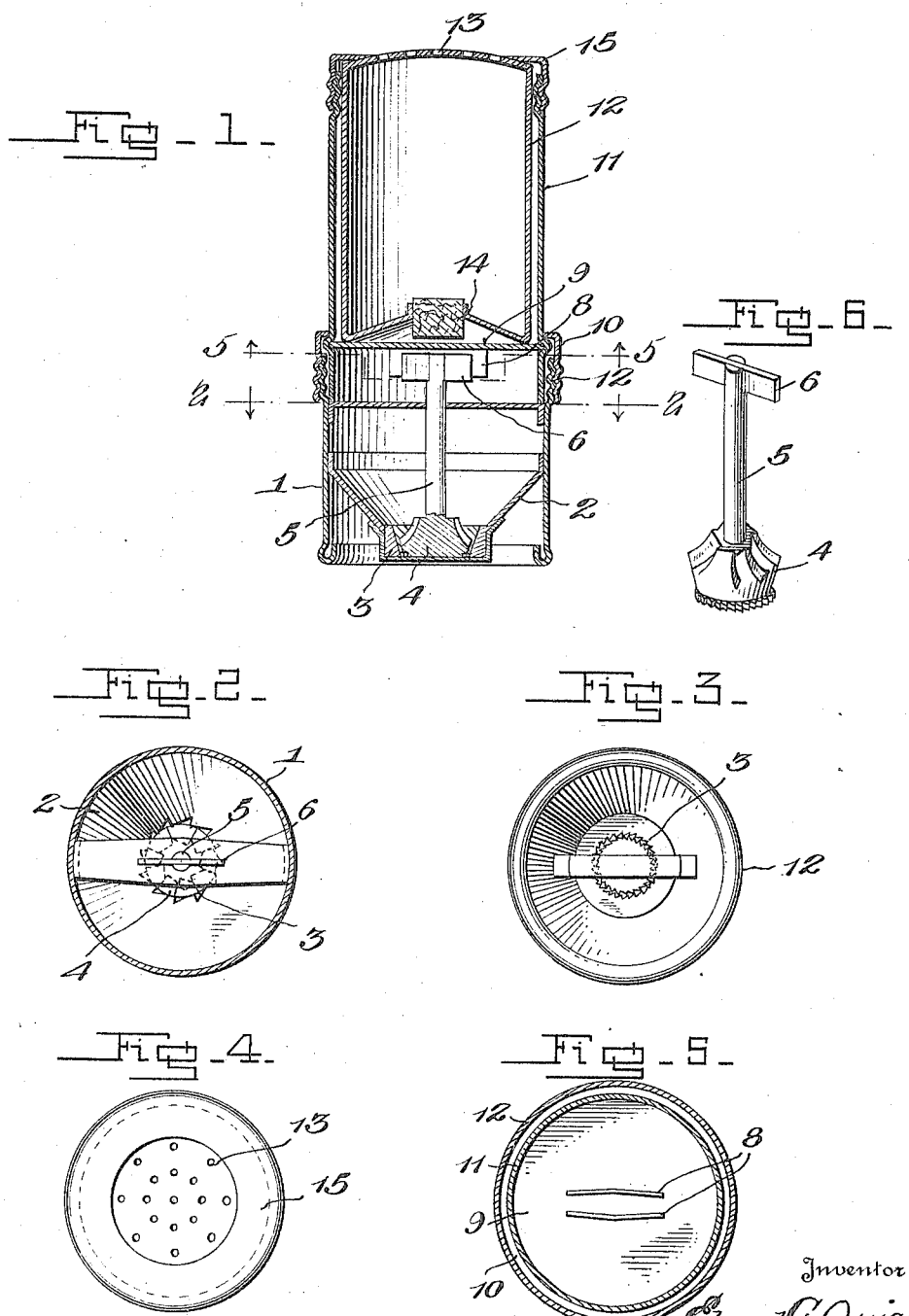

EDWARD C. QUICK, OF BERKELEY SPRINGS, WEST VIRGINIA.

COMBINED SALT-SHAKER AND PEPPER-GRINDER.

1,264,134.  Specification of Letters Patent.  Patented Apr. 23, 1918.

Application filed December 9, 1916. Serial No. 136,015.

*To all whom it may concern:*

Be it known that I, EDWARD C. QUICK, a citizen of the United States, residing at Berkeley Springs, in the county of Morgan and State of West Virginia, have invented new and useful Improvements in Combined Salt-Shakers and Pepper-Grinders, of which the following is a specification.

The object of my invention is to provide a novel combination salt shaker and pepper grinder; to provide novel means for operating the grinder without taking the device apart; to provide a device that will not easily tip over, and that has no delicate or complex parts; and to provide a device that is easy to keep clean and which may be readily assembled or taken apart.

I attain these objects by the mechanism illustrated in the accompanying drawings, in which—

Figure 1 is a vertical section of the entire device; Fig. 2 is a horizontal section on line 2—2 of Fig. 1; Fig. 3 is a bottom plan view; Fig. 4 is a top plan view; Fig. 5 is a horizontal section on line 5—5 of Fig. 1; and Fig. 6 is a detail of the pepper grinding element.

Similar numerals refer to similar parts throughout the several views.

Referring to the accompanying drawings I provide a suitable pepper receptacle 1 in which is mounted a pepper grinding cup of inverted conical form, having a grinding element 3. Seated in member 3 is a pepper grinding bur 4 which is actuated by post 5, arms 6, the latter being engaged by depending flanges or wings 8 attached to plate 9, which is mounted in the grooved or corrugated portion 10 of the salt-holding receptacle 11. Member 11 is secured to pepper receptacle 1 by a collar 12, the upper portion of which is bent inwardly to engage over the corrugated portion 10 and the lower portion of which is corrugated to engage member 1, as shown.

Mounted in member 11 is a suitable salt receptacle 12 having the usual orificed end 13, for shaking the salt out and stoppered end 14 to permit of refilling the receptacle. A suitable collar member 15 secures receptacle 12 to member 11, as shown, while permitting of readily disassembling the device.

To grind the pepper in pepper cup 2 it is merely necessary to rotate member 11, and as member 9 is securely affixed to the grooved portion 10 of member 11, it likewise is rotated and its depending flanges or wings 8, which engage on opposite sides of arms 6 of the grinding element, cause post 5 and grinding bur 4 to rotate and grind the pepper. The device makes it possible to have freshly ground pepper, having its full strength and aroma. It also has the advantage of also containing a salt shaker in operative relation to it and without complicated parts. It is merely necessary to unscrew collar 15 from the member 11 when it is desired to remove and refill salt shaker 14. It is within the contemplation of my invention to make minor modifications in the construction of the salt receptacle 12. The device is a combined salt shaker and pepper grinder, not a combined salt shaker and pepper shaker. It is not intended for semi-liquids such as mustard, but only for salt and pepper. Nor is it designed for the grinding and ejection of caked salt. The salt shaker may be made with an ordinary perforated screw top or may contain a salt cup of glass, china, aluminum, or other non-corroding material, held in place by a screw collar 15. It is also within the contemplation of my invention to make the device of any suitable material, such as silver, cut glass, wood, aluminum, or white metal plated with silver. The grinding bur is preferably made of steel in all cases, however.

What I claim is:

In a combined salt shaker and pepper grinder, the combination of a pepper receptacle, a salt receptacle, a casing releasably connecting the two receptacles, a collar for releasably securing salt receptacle in the aforesaid casing, a transverse plate attached to the casing and interposed between the salt receptacle and the pepper receptacle, parallel flanges projecting from said plate, a T-shaped pepper grinding element having the T projecting between and adapted to be operated by the aforesaid flanges when the casing of the salt receptacle is rotated to grind fresh pepper in the pepper receptacle, and a grinding element in the pepper receptacle adapted to coöperate with a corresponding burred portion of the T-shaped element to grind the pepper, whereby salt and freshly ground pepper are obtainable from a single device without taking same apart.

EDWARD C. QUICK.

*Copies of this patent may be obtained for five cents each, by addressing the "Commissioner of Patents, Washington, D. C."*